United States Patent [19]

Jeong et al.

[11] Patent Number: 5,729,690
[45] Date of Patent: Mar. 17, 1998

[54] VARIABLE LENGTH ENCODING METHOD AND APPARATUS FOR DIFFERENTIAL MOTION VECTOR VALUES USING AN IMPROVED DIFFERENTIAL MOTION CODE TABLE

[75] Inventors: Jechang Jeong, Seoul; Joohan Kwon, Suwon, both of Rep. of Korea

[73] Assignee: Samsung Electronics Co., Ltd., Kyungki-Do, Rep. of Korea

[21] Appl. No.: 436,012

[22] Filed: May 5, 1995

[30] Foreign Application Priority Data

May 11, 1994 [KR] Rep. of Korea ............ 94-10304

[51] Int. Cl.⁶ ................................. G06F 17/00
[52] U.S. Cl. ................................. 395/200.76
[58] Field of Search .............. 364/514 R, 715.02; 348/415, 420, 423, 416, 407, 438; 375/245; 341/67, 106; 395/200.18

[56] References Cited

U.S. PATENT DOCUMENTS

| | | | |
|---|---|---|---|
| 5,150,432 | 9/1992 | Ueno et al. | 348/407 |
| 5,428,396 | 6/1995 | Yagasaki et al. | 348/416 |
| 5,485,213 | 1/1996 | Murashita et al. | 348/415 |
| 5,508,492 | 4/1996 | Agarwal | 364/514 R |
| 5,539,401 | 7/1996 | Kumaki et al. | 341/67 |

*Primary Examiner*—Ellis B. Ramirez
*Attorney, Agent, or Firm*—Sughrue, Mion, Zinn, Macpeak & Seas, PLLC

[57] ABSTRACT

A variable-length coding apparatus for encoding motion vector values using improved differential motion code table variable-length-codes, wherein the differential motion vector value is the difference between the motion vector values of a single frame. A delay in the encoder delays an input motion vector value until a next motion vector value is input thereto, and outputs the delayed motion vector value. A subtracter calculates a difference value between the delayed motion vector value and the next motion vector value. A variable-length code uses an altered differential motion code table so that a longer variable-length code is assigned thereto as the magnitude of the absolute value of the differential motion vector value is larger, while a shorter variable-length code is assigned thereto as the magnitude of the absolute value of the differential motion vector value is smaller, even for the differential motion vector values outside the range of the motion vector values generated in a single frame, from a differential motion code table generated based on a method proposed by "ISO/IEC 11172-2", and variable-length-codes of an input differential motion vector value. Thus, the motion vector values can be more efficiently encoded than that of using the existing table without modifying the existing hardware structure.

9 Claims, 6 Drawing Sheets

FIG. 1 (PRIOR ART)

| VLC code | Value |
|---|---|
| 0000 0011 001 | −16 |
| 0000 0011 011 | −15 |
| 0000 0011 101 | −14 |
| 0000 0011 111 | −13 |
| 0000 0100 001 | −12 |
| 0000 0100 011 | −11 |
| 0000 0100 11 | −10 |
| 0000 0101 01 | −9 |
| 0000 0101 11 | −8 |
| 0000 0111 | −7 |
| 0000 1001 | −6 |
| 0000 1011 | −5 |
| 0000 11 | −4 |
| 0001 1 | −3 |
| 0011 | −2 |
| 011 | −1 |
| 1 | 0 |
| 010 | 1 |
| 0010 | 2 |
| 0001 0 | 3 |
| 0000 110 | 4 |
| 0000 1010 | 5 |
| 0000 1000 | 6 |
| 0000 0110 | 7 |
| 0000 0101 10 | 8 |
| 0000 0101 00 | 9 |
| 0000 0100 10 | 10 |
| 0000 0100 010 | 11 |
| 0000 0100 000 | 12 |
| 0000 0011 110 | 13 |
| 0000 0011 100 | 14 |
| 0000 0011 010 | 15 |
| 0000 0011 000 | 16 |

FIG. 2A (PRIOR ART)

| DIFFERENTIAL VALUE | VLC code | DIFFERENTIAL VALUE | VLC code |
|---|---|---|---|
| -16 | 0000 0011 001 | 16 | 0000 0011 001 |
| -15 | 0000 0011 011 | 17 | 0000 0011 011 |
| -14 | 0000 0011 101 | 18 | 0000 0011 101 |
| -13 | 0000 0011 111 | 19 | 0000 0011 111 |
| -12 | 0000 0100 001 | 20 | 0000 0100 001 |
| -11 | 0000 0100 011 | 21 | 0000 0100 011 |
| -10 | 0000 0100 11 | 22 | 0000 0100 11 |
| -9 | 0000 0101 01 | 23 | 0000 0101 01 |
| -8 | 0000 0101 11 | 24 | 0000 0101 11 |
| -7 | 0000 0111 | 25 | 0000 0111 |
| -6 | 0000 1001 | 26 | 0000 1001 |
| -5 | 0000 1011 | 27 | 0000 1011 |
| -4 | 0001 1 | 28 | 0001 1 |
| -3 | 0011 | 29 | 0011 |
| -2 | 011 | | |
| -1 | 1 | | |
| 0 | 010 | -29 | 010 |
| 1 | 0010 0 | -28 | 0010 0 |
| 2 | 0001 0 | -27 | 0001 0 |
| 3 | 0000 110 | -26 | 0000 110 |
| 4 | 0000 1010 | -25 | 0000 1010 |
| 5 | 0000 1000 | -24 | 0000 1000 |
| 6 | 0000 0110 | -23 | 0000 0110 |
| 7 | 0000 0101 10 | -22 | 0000 0101 10 |
| 8 | 0000 0101 00 | -21 | 0000 0101 00 |
| 9 | 0000 0100 10 | -20 | 0000 0100 10 |
| 10 | 0000 0100 000 | -19 | 0000 0100 000 |
| 11 | 0000 0011 110 | -18 | 0000 0011 110 |
| 12 | 0000 0011 100 | -17 | 0000 0011 100 |
| 13 | 0000 0011 010 | | |
| 14 | | | |
| 15 | | | |

FIG. 2B (PRIOR ART)

| DIFFERENTIAL VALUE | | | | | VLC code |
|---|---|---|---|---|---|
| | residual code | | | | |
| | 0 | 10 | 11 | 0 | |
| -46 | -47 | -48 | 0 | 48 | 0000 0011 001 |
| -43 | -44 | -45 | | 51 | 0000 0011 011 |
| -40 | -41 | -42 | | 54 | 0000 0011 101 |
| -37 | -36 | -39 | | 57 | 0000 0011 111 |
| -34 | -35 | -36 | | 60 | 0000 0100 001 |
| -31 | -32 | -33 | | 63 | 0000 0100 011 |
| -28 | -29 | -30 | | 66 | 0000 0100 11 |
| -25 | -26 | -27 | | 69 | 0000 0101 01 |
| -22 | -23 | -24 | | 72 | 0000 0101 11 |
| -19 | -20 | -21 | | 75 | 0000 0111 |
| -16 | -17 | -18 | | 78 | 0000 1001 |
| -13 | -14 | -15 | | 81 | 0000 1011 |
| -10 | -11 | -12 | | 84 | 0001 1 |
| -7 | -8 | -9 | | 87 | 0011 |
| -4 | -5 | -6 | | 90 | 011 |
| -1 | -2 | -3 | | 93 | 1 |
| | | | 0 | | |
| 1 | 2 | 3 | | -93 | 010 |
| 4 | 5 | 6 | | -90 | 0010 0 |
| 7 | 8 | 9 | | -87 | 0001 0 |
| 10 | 11 | 12 | | -84 | 0000 110 |
| 13 | 14 | 15 | | -81 | 0000 1010 |
| 16 | 17 | 18 | | -78 | 0000 1000 |
| 19 | 20 | 21 | | -75 | 0000 0110 |
| 22 | 23 | 24 | | -72 | 0000 0101 10 |
| 25 | 26 | 27 | | -69 | 0000 0101 00 |
| 28 | 29 | 30 | | -66 | 0000 0100 10 |
| 31 | 32 | 33 | | -63 | 0000 0100 010 |
| 34 | 35 | 36 | | -60 | 0000 0100 000 |
| 37 | 38 | 39 | | -57 | 0000 0011 110 |
| 40 | 41 | 42 | | -54 | 0000 0011 100 |
| 43 | 44 | 45 | | -51 | 0000 0011 010 |

FIG. 2C(PRIOR ART)

| DIFFERENTIAL VALUE | | | | | | | | | VLC code |
|---|---|---|---|---|---|---|---|---|---|
| residual code | | | | | | | | | |
| 00 | 01 | 10 | 110 | 111 | 111 | 110 | 10 | 01 | 00 | |
| −76 | −77 | −78 | −79 | −80 | | | 78 | 79 | 80 | 0000 0011 001 |
| −71 | −72 | −73 | −74 | −75 | | | 83 | 84 | 85 | 0000 0011 011 |
| −66 | −67 | −68 | −69 | −70 | | | 88 | 89 | 90 | 0000 0011 101 |
| −61 | −62 | −63 | −64 | −65 | | | 93 | 94 | 95 | 0000 0011 111 |
| −56 | −57 | −58 | −59 | −60 | | | 98 | 99 | 100 | 0000 0100 001 |
| −51 | −52 | −53 | −54 | −55 | | | 103 | 104 | 105 | 0000 0100 01 |
| −46 | −47 | −48 | −49 | −50 | | | 108 | 109 | 110 | 0000 0100 11 |
| −41 | −42 | −43 | −44 | −45 | | | 113 | 114 | 115 | 0000 0101 01 |
| −36 | −37 | −38 | −39 | −40 | | | 118 | 119 | 120 | 0000 0101 11 |
| −31 | −32 | −33 | −34 | −35 | | | 123 | 124 | 125 | 0000 0111 |
| −26 | −27 | −28 | −29 | −30 | | | 128 | 129 | 130 | 0000 1001 |
| −21 | −22 | −23 | −24 | −25 | | | 133 | 134 | 135 | 0000 1011 |
| −16 | −17 | −18 | −19 | −20 | | | 138 | 139 | 140 | 0000 111 |
| −11 | −12 | −13 | −14 | −15 | | | 143 | 144 | 145 | 0001 1 |
| −6 | −7 | −8 | −9 | −10 | | | 148 | 149 | 150 | 0011 |
| −1 | −2 | −3 | −4 | −5 | | | 153 | 154 | 155 | 011 |
| | | | | | 0 | | | | | 1 |
| | | | | | −151 | −152 | −153 | −154 | −155 | 010 |
| 1 | 2 | 3 | 4 | 5 | | | | | | 0010 |
| 6 | 7 | 8 | 9 | 10 | −146 | −147 | −148 | −149 | −150 | 0001 0 |
| 11 | 12 | 13 | 14 | 15 | −141 | −142 | −143 | −144 | −145 | 0000 110 |
| 16 | 17 | 18 | 19 | 20 | −136 | −137 | −138 | −139 | −140 | 0000 1010 |
| 21 | 22 | 23 | 24 | 25 | −131 | −132 | −133 | −134 | −135 | 0000 1000 |
| 26 | 27 | 28 | 29 | 30 | −126 | −127 | −128 | −129 | −130 | 0000 0110 |
| 31 | 32 | 33 | 34 | 35 | −121 | −122 | −123 | −124 | −125 | 0000 0101 10 |
| 36 | 37 | 38 | 39 | 40 | −116 | −117 | −118 | −119 | −120 | 0000 0101 00 |
| 41 | 42 | 43 | 44 | 45 | −111 | −112 | −113 | −114 | −115 | 0000 0100 10 |
| 46 | 47 | 48 | 49 | 50 | −106 | −107 | −108 | −109 | −110 | 0000 0100 010 |
| 51 | 52 | 53 | 54 | 55 | −101 | −102 | −103 | −104 | −105 | 0000 0100 000 |
| 56 | 57 | 58 | 59 | 60 | −96 | −97 | −98 | −99 | −100 | 0000 0011 110 |
| 61 | 62 | 63 | 64 | 65 | −91 | −92 | −93 | −94 | −95 | 0000 0011 100 |
| 66 | 67 | 68 | 69 | 70 | −86 | −87 | −88 | −89 | −90 | 0000 0011 010 |
| 71 | 72 | 73 | 74 | 75 | −81 | −82 | −83 | −84 | −85 | 0000 0011 000 |

FIG. 3A

| DIFFERENTIAL VALUE | VLC code | DIFFERENTIAL VALUE | VLC code |
|---|---|---|---|
| −16 | 0000 0011 001 | 29 | 0000 0011 000 |
| −15 | 0000 0011 011 | 28 | 0000 0011 010 |
| −14 | 0000 0011 101 | 27 | 0000 0011 100 |
| −13 | 0000 0011 111 | 26 | 0000 0011 110 |
| −12 | 0000 0100 001 | 25 | 0000 0100 000 |
| −11 | 0000 0100 011 | 24 | 0000 0100 010 |
| −10 | 0000 0100 11 | 23 | 0000 0100 10 |
| −9 | 0000 0101 01 | 22 | 0000 0101 00 |
| −8 | 0000 0101 11 | 21 | 0000 0101 10 |
| −7 | 0000 0111 | 20 | 0000 0110 |
| −6 | 0000 1001 | 19 | 0000 1000 |
| −5 | 0000 1011 | 18 | 0000 1010 |
| −4 | 0000 111 | 17 | 0000 110 |
| −3 | 0001 1 | 16 | 0001 0 |
| −2 | 0011 | | |
| −1 | 011 | | |
| 0 | 1 | | |
| 1 | 010 | −17 | 0000 0101 10 *(see table)* |
| 2 | 0010 | | |
| 3 | 0001 0 | | |
| 4 | 0000 110 | | |
| 5 | 0000 1010 | | |
| 6 | 0000 1000 | | |
| 7 | 0000 0110 | −17 | 0000 0101 10 |
| 8 | 0000 0101 10 | −18 | 0000 0101 00 |
| 9 | 0000 0101 00 | −19 | 0000 0100 10 |
| 10 | 0000 0100 10 | −20 | 0000 0100 000 |
| 11 | 0000 0100 000 | −21 | 0000 0100 010 |
| 12 | 0000 0011 110 | −22 | 0000 0100 100 |
| 13 | 0000 0011 100 | −23 | 0000 0011 110 |
| 14 | 0000 0011 010 | −24 | 0000 0100 010 |
| 15 | 0000 0011 000 | −25 | 0000 0100 010 |
| | | −26 | 0000 0100 000 |
| | | −27 | 0000 0011 110 |
| | | −28 | 0000 0011 100 |
| | | −29 | 0000 0010 |

FIG. 3B

| DIFFERENTIAL VALUE (residual code) | | | VLC code |
|---|---|---|---|
| 0 | 10 | 11 | |
| −46 | −47 | −48 | 0000 0011 001 |
| −43 | −44 | −45 | 0000 0011 011 |
| −40 | −41 | −42 | 0000 0011 101 |
| −37 | −38 | −39 | 0000 0011 111 |
| −34 | −35 | −36 | 0000 0100 001 |
| −31 | −32 | −33 | 0000 0100 011 |
| −28 | −29 | −30 | 0000 0100 11 |
| −25 | −26 | −27 | 0000 0101 01 |
| −22 | −23 | −24 | 0000 0101 11 |
| −19 | −20 | −21 | 0000 0111 |
| −16 | −17 | −18 | 0000 1001 |
| −13 | −14 | −15 | 0000 1011 |
| −10 | −11 | −12 | 0000 111 |
| −7 | −8 | −9 | 0001 1 |
| −4 | −5 | −6 | 0011 |
| −1 | −2 | −3 | 011 |
| 0 | | | 1 |
| 1 | 2 | 3 | 010 |
| 4 | 5 | 6 | 0010 |
| 7 | 8 | 9 | 0001 0 |
| 10 | 11 | 12 | 0000 110 |
| 13 | 14 | 15 | 0000 1010 |
| 16 | 17 | 18 | 0000 1000 |
| 19 | 20 | 21 | 0000 0110 |
| 22 | 23 | 24 | 0000 0101 10 |
| 25 | 26 | 27 | 0000 0101 00 |
| 28 | 29 | 30 | 0000 0100 10 |
| 31 | 32 | 33 | 0000 0100 000 |
| 34 | 35 | 36 | 0000 0011 110 |
| 37 | 38 | 39 | 0000 0011 100 |
| 40 | 41 | 42 | 0000 0011 010 |
| 43 | 44 | 45 | 0000 0011 000 |

| DIFFERENTIAL VALUE (residual code) | | | VLC code |
|---|---|---|---|
| 0 | 10 | 11 | |
| 91 | 92 | 93 | 0000 0010 10 |
| 88 | 89 | 90 | 0000 0011 00 |
| 85 | 86 | 87 | 0000 0011 10 |
| 82 | 83 | 84 | 0000 0100 00 |
| 79 | 80 | 81 | 0000 0100 11 |
| 76 | 77 | 78 | 0000 0101 01 |
| 73 | 74 | 75 | 0000 0101 11 |
| 70 | 71 | 72 | 0000 0110 |
| 67 | 68 | 69 | 0000 0111 |
| 64 | 65 | 66 | 0000 1000 |
| 61 | 62 | 63 | 0000 1010 |
| 58 | 59 | 60 | 0000 110 |
| 55 | 56 | 57 | 0001 0 |
| 52 | 53 | 54 | 0000 0110 |
| 49 | 50 | 51 | 0000 0101 10 |
| 46 | 47 | 48 | 0000 0101 00 |
| −49 | −50 | −51 | 0000 0100 10 |
| −52 | −53 | −54 | 0000 0100 000 |
| −55 | −56 | −57 | 0000 0100 010 |
| −58 | −59 | −60 | 0000 0100 100 |
| −61 | −62 | −63 | 0000 0011 110 |
| −64 | −65 | −66 | 0000 0100 010 |
| −67 | −68 | −69 | 0000 0100 010 |
| −70 | −71 | −72 | 0000 0100 000 |
| −73 | −74 | −75 | 0000 0011 110 |
| −76 | −77 | −78 | 0000 0011 100 |
| −79 | −80 | −81 | 0000 0011 010 |
| −82 | −83 | −84 | 0000 0011 000 |
| −85 | −86 | −87 | 0000 0011 110 |
| −88 | −89 | −90 | 0000 0011 100 |
| −91 | −92 | −93 | 0000 0011 010 |

FIG. 3C

| DIFFERENTIAL VALUE | | | | | | | | VLC code |
|---|---|---|---|---|---|---|---|---|
| residual code | | | | | | | | |
| 00 | 01 | 10 | 110 | 111 | 111 | 110 | 10 | 01 | 00 | |
| −76 | −77 | −78 | −79 | −80 | 155 | 154 | 153 | 152 | 151 | 0000 0011 001 |
| −71 | −72 | −73 | −74 | −75 | 150 | 149 | 148 | 147 | 146 | 0000 0011 011 |
| −66 | −67 | −68 | −69 | −70 | 145 | 144 | 143 | 142 | 141 | 0000 0011 101 |
| −61 | −62 | −63 | −64 | −65 | 140 | 139 | 138 | 137 | 136 | 0000 0011 111 |
| −56 | −57 | −58 | −59 | −60 | 135 | 134 | 133 | 132 | 131 | 0000 0100 001 |
| −51 | −52 | −53 | −54 | −55 | 130 | 129 | 128 | 127 | 126 | 0000 0100 011 |
| −46 | −47 | −48 | −49 | −50 | 125 | 124 | 123 | 122 | 121 | 0000 0100 11 |
| −41 | −42 | −43 | −44 | −45 | 120 | 119 | 118 | 117 | 116 | 0000 0101 01 |
| −36 | −37 | −38 | −39 | −40 | 115 | 114 | 113 | 112 | 111 | 0000 0101 11 |
| −31 | −32 | −33 | −34 | −35 | 110 | 109 | 108 | 107 | 106 | 0000 0111 |
| −26 | −27 | −28 | −29 | −30 | 105 | 104 | 103 | 102 | 101 | 0000 1001 |
| −21 | −22 | −23 | −24 | −25 | 100 | 99 | 98 | 97 | 96 | 0000 1011 |
| −16 | −17 | −18 | −19 | −20 | 95 | 94 | 93 | 92 | 91 | 0000 111 |
| −11 | −12 | −13 | −14 | −15 | 90 | 89 | 88 | 87 | 86 | 0001 1 |
| −6 | −7 | −8 | −9 | −10 | 85 | 84 | 83 | 82 | 81 | 0011 |
| −1 | −2 | −3 | −4 | −5 | 80 | 79 | 78 | 77 | 76 | 011 |
|  |  |  |  | 0 |  |  |  |  |  | 1 |
| 1 | 2 | 3 | 4 | 5 | −85 | −84 | −83 | −82 | −81 | 010 |
| 6 | 7 | 8 | 9 | 10 | −90 | −89 | −88 | −87 | −86 | 0010 |
| 11 | 12 | 13 | 14 | 15 | −95 | −94 | −93 | −92 | −91 | 0001 0 |
| 16 | 17 | 18 | 19 | 20 | −100 | −99 | −98 | −97 | −96 | 0000 110 |
| 21 | 22 | 23 | 24 | 25 | −105 | −104 | −103 | −102 | −101 | 0000 1010 |
| 26 | 27 | 28 | 29 | 30 | −110 | −109 | −108 | −107 | −106 | 0000 1000 |
| 31 | 32 | 33 | 34 | 35 | −115 | −114 | −113 | −112 | −111 | 0000 0110 |
| 36 | 37 | 38 | 39 | 40 | −120 | −119 | −118 | −117 | −116 | 0000 0101 10 |
| 41 | 42 | 43 | 44 | 45 | −125 | −124 | −123 | −122 | −121 | 0000 0101 00 |
| 46 | 47 | 48 | 49 | 50 | −130 | −129 | −128 | −127 | −126 | 0000 0100 10 |
| 51 | 52 | 53 | 54 | 55 | −135 | −134 | −133 | −132 | −131 | 0000 0100 010 |
| 56 | 57 | 58 | 59 | 60 | −140 | −139 | −138 | −137 | −136 | 0000 0100 000 |
| 61 | 62 | 63 | 64 | 65 | −145 | −144 | −143 | −142 | −141 | 0000 0011 110 |
| 66 | 67 | 68 | 69 | 70 | −150 | −149 | −148 | −147 | −146 | 0000 0011 100 |
| 71 | 72 | 73 | 74 | 75 | −155 | −154 | −153 | −152 | −151 | 0000 0011 010 |

VARIABLE LENGTH ENCODING METHOD AND APPARATUS FOR DIFFERENTIAL MOTION VECTOR VALUES USING AN IMPROVED DIFFERENTIAL MOTION CODE TABLE

BACKGROUND OF THE INVENTION

1. Field of the Invention

The present invention relates to a variable-length encoding method and apparatus for a differential motion vector value using a differential motion code table. More particularly it relates to a variable-length encoding method and apparatus for a differential motion vector value using an improved differential motion code table, in which an amount of data generated due to encoding of motion vector values can be reduced by improving the differential motion code table for variable-length-encoding a differential value between adjacent motion vector values within an image frame.

2. Description of Related Art

Generally, if an analog image signal is converted into digital data, the amount of data to be processed is increased. For this reason a variety of methods are used to reduce the total amount of image signal data by removing redundant data included in the digital data image.

Among these methods, there is a prediction encoding method for encoding image data using differential values of image data between adjacent frames. The prediction encoding method uses a motion vector for performing a motion-compensation operation with respect to a predetermined image block. The motion vector is obtained by motion-estimation between adjacent image frames. When one image frame is composed of i x j image blocks, the number of motion vectors per frame generated by motion estimation is i x j. An encoder uses such a motion vector for motion-compensation with respect to the image blocks, and then transmits the motion vector to a decoder for decoding the encoded image data. The encoder encodes the motion vector before transmitting it to the decoder, in order to reduce the amount of the transmission data for the motion vector.

The method for encoding the motion vector obtains a differential value between the motion vectors corresponding to two sequentially generated motion vectors, that is, two respectively adjacent macroblocks, and then allocates a variable-length code to the differential value. To variable-length-encode the differential motion vector value, which is the differential value between the motion vector values, a differential motion code table, which is used in "ISO/IEC 11172-2", is shown in FIG. 1.

FIG. 1 shows variable-length codes when a differential motion vector value ranges from −16 to 16. As a whole, since magnitudes of the motion vector values between the adjacent macroblocks are similar to each other, the differential value is close to zero. Thus, the frequency with which the differential value between the motion vector values is close to zero becomes high, while the frequency with which the differential value between the motion vector values is large becomes low. The table of FIG. 1, which is based on such statistical characteristics shows that a relatively short code is assigned to a differential value close to zero, which has a high frequency of occurrence, and a relatively long code is assigned to a differential value having a low frequency.

FIGS. 2A through 2C show other conventional differential motion code tables, respectively, which are different from the table of FIG. 1, and which have been used for variable-length-encoding the differential motion vector value. The differential motion code tables of FIGS. 2A through 2C are based on the FIG. 1 differential motion code table according to a table makeup method presented in "ISO/IEC 11172-2", and the differential motion vector values generated in the image frame have ranges different from that of the table of FIG. 1.

FIG. 2A shows a differential motion code table for a case where the differential motion vector values, obtained from the motion vector values generated in the image frame, range from −29 to 29. In the table shown in FIG. 2A, in the case of the "differential values" listed on the left-hand side of the column, the variable-length codes are identical to those of the differential motion code table of FIG. 1. For the "differential values" listed on the right-hand side of the column, a modulus of "32" is added thereto or subtracted therefrom, and the variable-length codes listed on the left-hand side of the column corresponding to the value obtained by addition or subtraction, are assigned as variable-length codes corresponding to the differential motion vector value. For example, the differential motion vector value of "29 " is assigned a variable-length code corresponding to "−3" which is obtained by subtracting a modulus of "32" from "29". The differential motion vector value of "−29 " is assigned a variable-length code corresponding to which is obtained by adding a modulus of "32" to "−29". If the differential motion vector values are variable-length-encoded by using the variable-length code assigned in this way, the variable-length-encoded vector values can be decoded by using the modulus information for performing addition or subtraction, to reproduce the differential motion vector value corresponding to the variable-length code.

FIG. 2B shows a differential motion code table for a case where the differential motion vector values, obtained from the motion vector values generated in the image frame, range from −48 to 48. A process for generating the table shown in FIG. 2B is described below for which a parameter (f) for selecting a motion vector range, is three and for the case in which the motion vector value ranges from "−48" to "45". First, a modulus of "94", which is determined by the range of the motion vector values is added to or subtracted from the differential motion vector value, in order to generate the differential motion vector values within a range of "−48" and "45" which is the motion vector value range. If these values are reduced differential motion vector values (mvd), then a value of "{mvd+sign(mvd)(f-I)}" is calculated with respect to the parameter (f) and the respectively reduced differential motion vector (mvd), and the calculation result is divided by the parameter (f). The quotient, having a sign obtained by the division operation, corresponds to the variable-length code which is the same as the differential motion vector value in the table of FIG. 1. The variable-length code is concatenated with a predetermined code so as to correspond to an absolute value of the residue to form a single perfect codeword. The table shown in FIG. 2B is generated in this manner, and has a residual code for discriminating between six differential motion vector values corresponding to the same variable-length code. The differential motion vector values which are not discriminated by the residual code are discriminated by the addition or subtraction of the modulus. If the differential motion vector value is variable-length-encoded by using the coding table, a codeword generated by the variable-length-encoding operation is composed of a variable-length code corresponding to the differential motion vector value and a residual code concatenated to the variable-length code. The residual code is placed in the same column as that of the differential motion vector value. For example, when the differential motion vector value is "7", the variable-length code codeword is "0001 00" which is obtained by concatenating a code "0001 0" corresponding to the differential motion vector value "7" with a residual code "0" which is the residual value shown in the same column as that of the differential motion vector value. When the differential value is "59," the codeword becomes "0000 0100 00110" which is obtained by concatenating the corresponding variable-length code "0000 01 00 001" with the residual code "10" which is the residual value for the column in which "59" appears. Looking at the right three columns for the differential motion vector values, it can be seen that the differential values having relatively large absolute values, such as "90", "91", "–92"and "–93", have a very low frequency of occurrence and are assigned with relatively short variable-length codes, while the differential values having relatively small absolute values such as "46", "47", "–49" and "50"have a relatively high frequency of occurrence and are assigned with relatively long variable-length codes. Encoding of the motion vector values as described with respect to an image using such a table increases a quantity of generated bits.

FIG. 2C shows a differential motion code table for the case where the differential motion vector values obtained from the motion vector values generated in the image frame, range from –80 to 75. A process of generating the table shown in FIG. 2C is the same process as that for generating the table of FIG. 2B when the motion vector range selection parameter (f) is "5" and in the case where the motion vector value ranges from "–80" to "75". The table shown in FIG. 2C generated in this manner, has a residual code for discriminating ten differential motion vector values corresponding to the same variable-length code. The differential motion vector values which are not discriminated by the residual code are discriminated by addition or subtraction of the modulus. The differential motion vector values of the left five columns are assigned with shorter variable-length codes as the differential motion vector values, as they have a lower frequency of occurrence, while the differential motion vector values of the right five columns are assigned with longer variable-length codes with respect to the differential motion vector values having the low frequency of occurrence.

As described above, when the differential motion vector values are variable-length-encoded using conventional differential motion code tables, the differential motion vector values outside the range of the motion vector values are assigned with long variable-length codes even though the differential motion vector values occur with a high frequency. Accordingly, since the amount of data generated by the variable-length coding becomes large, the total encoding efficiency is lowered.

SUMMARY OF THE INVENTION

Therefore, to solve the above problems, it is an object of the present invention to provide a method for efficiently variable-length-encoding a differential motion vector value, by improving a method of assigning a variable-length code with respect to a differential motion vector value of the conventional differential motion code table.

It is another object of the present invention to provide an apparatus for efficiently variable-length-encoding a differential motion vector value, by improving a method of assigning a variable-length code with respect to a differential motion vector value of the conventional differential motion code table.

To accomplish the above object of the present invention, there is provided a method for variable-length-coding a motion vector value for use in motion compensation comprising the steps of:

(i) altering a differential motion code table so that a shorter variable-length code is assigned to second differential motion vector values beyond the range of the motion vector values as the magnitudes of the second differential motion vector values are smaller, while a longer variable-length code is assigned to the second differential motion vector values beyond the range of the motion vector values as the magnitudes of the second differential motion vector values are larger, among a differential motion code table made by the steps of adding a modulus determined by the range of the motion vector values, to differential motion vector values beyond a range of the motion vector values among first differential motion vector values of the motion vector values generated in an image or subtracting the former from latter, thereby producing the second differential motion vector values of which the magnitudes are altered into those of the motion vector values, and maintaining third differential motion vector values which are not departed from the range of the motion vector values as being in the case, thereby altering the range so that all first differential motion vector values are within the range of the motion vector values, calculating a quotient having a sign and an absolute value of a residue by substituting a vector range selection parameter (f) which is determined with respect to the range altered differential motion vector value (mvd) and the one image into an expression [mvd+(sign(mvd)x(f–1)]/f, and assigning a variable-length codeword with respect to each first differential motion vector value by using a predetermined residual code in correspondence to a variable-length code in the reference difference motion code table corresponding to the quotient having the sign, and the absolute value of the residue which is concatenated to the variable-length code;

(ii) delaying a received motion vector value until a next motion vector value is applied and outputting the delayed motion vector value;

(iii) calculating a differential motion vector value between the delayed motion vector value and the next motion vector value; and (iv) receiving the differential motion vector value of step (iii) and variable-length-coding the received differential motion vector value based on the altered differential motion code table of step (i), whereby variable-length-coding a differential motion vector value between motion vector values using a differential motion code table which is newly made on the basis of a reference differential motion code table for variable-length-coding the differential motion vector values.

To accomplish the above other object of the present invention, there is provided an apparatus for variable-length-coding a motion vector value for use in motion compensation comprising:

delay means for delaying a received motion vector value until a next motion vector value is applied and outputting the delayed motion vector value;

subtracter means for calculating a differential motion vector value between the delayed motion vector value and the next motion vector value; and a variable-length coder for storing an altered differential motion code table, receiving the differential motion vector value from subtracter means and variable-length-coding the differential motion vector value based on the stored altered differential motion code table, so that a shorter variable-length code is assigned to the second differential motion vector values beyond the range of the motion vector values as the magnitudes of the second differential motion vector values are smaller, while a longer variable-length code is assigned to the second differential motion vector values beyond the range of the motion vector values as the magnitudes of the second differential motion vector values are larger, among a differential motion code table made by a step of adding a modulus determined by the range of the motion vector values, to differential motion vector values beyond a range of the motion vector values among first differential motion vector values of the motion vector values generated in an image or subtracting the former from latter, thereby producing second differential motion vector values of which the magnitudes are altered into those of the motion vector values, and maintaining third differential motion vector values which are not departed from the range of the motion vector values as being in the case, thereby altering the range so that all first differential motion vector values are within the range of the motion vector values, a step of calculating a quotient having a sign and an absolute value of a residue by substituting a vector range selection parameter (f) which is determined with respect to the range altered differential motion vector value (mvd) and the one image into an expression [mvd+sign(mvd)x(f−1)]/f, and a step of assigning a variable-length codeword with respect to each first differential motion vector value by using a predetermined residual code in correspondence to a variable-length code in the reference difference motion code table corresponding to the quotient having the sign, and the absolute value of the residue which is concatenated to the variable-length code, whereby variable-length-coding a differential motion vector value between motion vector values using a differential motion code table which is newly made on the basis of a reference differential motion code table for variable-length-coding the differential motion vector values.

BRIEF DESCRIPTION OF THE DRAWINGS

FIG. 1 shows a differential motion code table for the case where the differential motion vector values range from −16 to 16.

FIGS. 2A through 2C show conventional differential motion code tables generated based on the differential motion code table of FIG. 1, respectively.

FIGS. 3A through 3C show differential motion code tables according to embodiments of the present invention, respectively.

DETAILED DESCRIPTION OF THE PREFERRED EMBODIMENT

Figure 4:
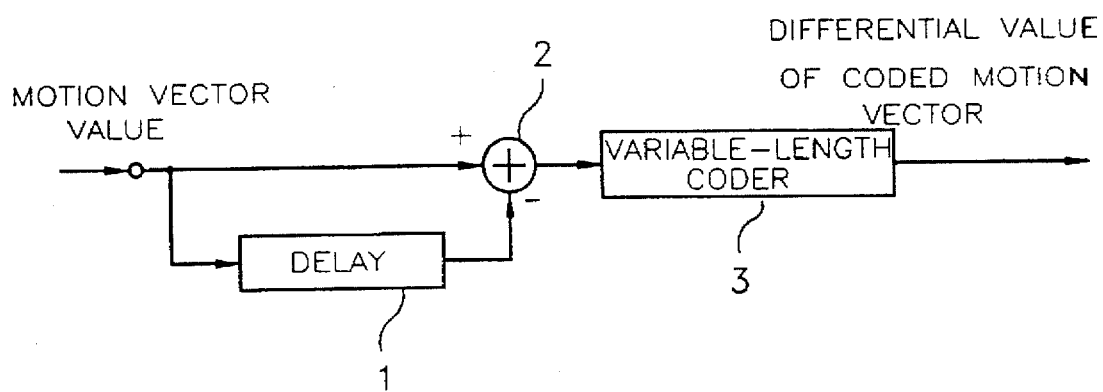
FIG. 4 is a block diagram of a motion vector encoder having an altered differential motion code table according to the present invention.

Preferred embodiments of the present invention are described below in more detail with reference to the accompanying FIGS. 3A through 3C and 4.

FIGS. 3A through 3C respectively show differential motion code tables according to preferred embodiments of the present invention. These tables are obtained by modifying the tables of FIGS. 2A through 2C, respectively. In the case of the differential motion vector values belonging to the same range as that of the motion vector values in a single frame, the same variable-length codes and/or the same residual codes as those of the corresponding tables shown in FIGS. 2A through, 2C are assigned thereto. On the other hand, in the case of the differential motion vector values which are outside the range of the motion vector values in a single frame, the variable-length code and the residual code are assigned thereto on the basis of the following method.

First, in the case of a differential motion vector value outside the range of the motion vector values, a shorter variable-length code is assigned when the magnitude of the absolute value of the differential motion vector is smaller, while a longer variable-length code is assigned when the magnitude of the absolute value of the differential motion vector is larger. More specifically, in the case of the largest positive differential motion vector value among all the differential motion vector values, the variable-length code and the residual code that is within the range of the motion vector value and corresponding to the largest negative differential motion vector value is assigned thereto. Then, in the case of the second largest positive differential motion vector value, the variable-length code and the residual code within the range of the motion vector values and which corresponds to the second largest negative differential motion vector value, is assigned thereto. In this manner the respective corresponding variable-length codes and residual codes are assigned to all the positive differential motion vector values outside the range of the motion vector values.

In the case of the negative differential motion vector values which are outside the range of the motion vector values, the variable-length code and the residual code within the range of the motion vector values and which corresponds to the largest positive differential motion vector value is assigned to the largest negative differential motion vector value. Similarly, variable-length code and the residual code within the range of the motion vector values and which corresponds to the second largest positive differential motion vector value, is assigned to the second largest negative differential motion vector value. In this manner, the respective corresponding variable-length codes and residual codes are assigned to all the negative differential motion vector values which are outside the range of the motion vector values.

In the differential motion code table of FIG. 3A, generated based on the above method, the differential values "−16" through "15" which are listed on the left-hand side of the "differential values" column and which are within the range of the motion vector values, have the same relationship between the differential motion vector values and the variable-length codes as those of FIG. 2A. However, the differential values "16 " through "29" and "−17" through "−29" which are listed on the right-hand side of the "differential values" column and are outside the range of the motion vector values, are assigned with the variable-length codes and residual codes according to the above-described method, which is different from that of FIG. 2A. That is, the differential values listed on the right-hand side of the "differential values" column are assigned with relatively long variable-length codes, since the magnitude of the absolute value thereof is larger than that of the values listed on the left-side of the column. In such a coding table, a shorter variable-length code is assigned to the differential motion vector value having a high frequency of occurrence, while a longer variable-length code is assigned to the differential motion vector value having a low frequency of occurrence. Accordingly, the total amount of data transmitted from the image signal encoder to the image signal decoder can be reduced.

In the table shown in FIG. 3B, the differential motion vector values within the range of "–48" to "45" which is the range of the motion vector values, are assigned with variable-length codes and residual codes in the same manner as that of FIG. 2B. On the other hand, in case of differential motion vector values listed in the three right-hand columns, a relatively short variable-length code is assigned to a smaller differential motion vector value having a high frequency of occurrence, while a relatively large variable-length code is assigned to a relatively larger differential motion vector value having a low frequency of occurrence.

In the table shown in FIG. 3C, similarly to FIGS. 3A and 3B, the differential motion vector values within the range of "–80" to "75", which is the range of the motion vector values and which corresponds to the five right-hand columns, are assigned with the same variable-length codes and residual codes as those of FIG. 2C. In the other differential motion vector values, a longer variable-length code is assigned to a differential motion vector value having a larger absolute value, while a shorter variable-length code is assigned to a differential motion vector value having a smaller absolute value.

FIG. 4 shows a motion vector encoder having an altered differential motion code table according to the present invention. The encoder shown in FIG. 4 performs an encoding operation with respect to the motion vector values generated with respect to a single image or frame. The motion vector values are used for motion estimation and motion compensation between a adjacent images. However, since generation of the motion vector values is known to one having ordinary skill in the art, the detailed descriptions will be omitted.

The construction and the operation of the apparatus as shown in FIG. 4 is described below. A delay 1 delays an input motion vector value and outputs the delayed motion vector value. An interval of time for delaying the motion vector value extends until a next motion vector value is input to the apparatus shown in FIG. 4. A subtracter 2 calculates a difference value between the delayed motion vector value and the next motion vector input to the apparatus of FIG. 4, and outputs the calculated result. A variable-length coder 3 stores one of the differential motion code tables shown in FIGS. 3A through 3C and variable-length-encodes the differential motion vector values input from subtracter 2 to generate a codeword. The differential motion code table stored in variable-length coder 3 can be established in advance according to the features of the images, or can be selected according to particular information relating to the motion vector values generated in the image frame. The codeword generated by variable-length coder 3 is transmitted to a decoder together with parity information indicating if a modulus is added to or subtracted from the differential motion vector value. Besides the parity information, motion vector range selection information (f) with respect to the image frame can also be inserted, when various differential motion code tables are used. Thus, a decoder detects a variable-length code and a residual code from the received codeword, and determines an original differential motion vector value among two differential motion vector values corresponding to the identical variable-length codes using the parity information and addition or subtraction of the modulus.

As described above, the variable-length encoding method and apparatus of the differential motion vector values using an improved differential motion code table according to the present invention can use standards of coding the motion vector values set forth in "ISO/IEC 11172-2" without any modification. That is, since the differential motion vector values are encoded in the same manner as that of the conventional art, by simply using a newly assigned table from a relationship of the differential motion vector value to the variable-length code and residual code in the differential motion code table, the motion vector values can be more efficiently encoded than that of using the existing table, without modifying the existing hardware structure.

While only certain embodiments of the invention have been specifically described herein, it will apparent that numerous modifications may be made thereto without departing from the spirit and scope of the invention.

What is claimed is:

1. A method for variable-length-encoding a motion vector value within a range of motion vector values in an image for use in motion compensation, comprising the steps of:

(i) generating a differential motion code table by a method comprising the steps of:

(a) one of adding and subtracting a modulus, determined based on the range of motion vector values, to first differential motion vector values outside the range of motion vector values, thereby producing second differential motion vector values;

(b) maintaining third differential motion vector values from the first differential motion vector values which are not outside the range of motion vector values, thereby altering the range of motion vector values so that all first differential motion vector values are within the range of motion vector values;

(c) assigning a variable-length codeword to each of said second and third differential motion vector values by using a predetermined residual code in correspondence with a variable-length code of a reference difference motion code table;

(ii) altering the differential motion code table by assigning relatively short variable-length codes to second differential motion vector values outside the range of motion vector values as the magnitudes of the second differential motion vector values become smaller, and assigning relatively long variable-length codes to the second differential motion vector values outside the range of the motion vector values as the magnitudes of the second differential motion vector values become larger;

(iii) delaying a received motion vector value until a next motion vector value is applied and outputting the delayed motion vector value;

(iv) calculating a differential motion vector value from the delayed motion vector value and the next motion vector value; and (v) receiving the differential motion vector value calculated in step (iv) and variable-length-encoding the received differential motion vector value according to the differential motion code table altered in step (ii).

2. The method for variable-length-encoding a motion vector value as recited in claim 1, wherein in step (ii)(c) the variable-length codeword is assigned based on a quotient calculated by substituting a vector range selection parameter (f), which is determined with respect to a range altered differential motion vector value (mvd) and the image, and the mvd into the expression f, whereby the residual code corresponds to the absolute value of a residue of the calculation, and wherein the residual code is concatenated to the variable-length code.

3. A method for variable-length-encoding a motion vector value according to claim 1, wherein said step (ii) comprises the steps of:
   (a) assigning a variable-length code and a residual code corresponding to the negative differential motion vector value having the largest absolute value and which is within the range of motion vector values, to the largest positive differential motion vector value among the second differential motion vector values;
   (b) assigning the variable-length code and the residual code corresponding to the negative differential motion vector value having the second largest absolute value and which is within the range of motion vector values, to the second largest positive differential motion vector value among the second differential motion vector values;
   (c) assigning variable-length codes and the residual codes respectively corresponding to the remaining negative differential motion vector values within the range of the motion vector values to the remaining second differential motion vector values having a positive value in the same manner as those assigned to the largest and second largest differential motion vector values;
   (d) assigning a variable-length code and a residual code corresponding to the positive differential motion vector value having the largest absolute value and which is within the range of motion vector values, to the largest negative differential motion vector value among the second differential motion vector values;
   (e) assigning a variable-length code and a residual code corresponding to the positive differential motion vector value having the second largest absolute value and within the range of motion vector values, to the second largest negative differential motion vector value among the second differential motion vector values; and
   (f) assigning the variable-length codes and the residual codes respectively corresponding to the remaining positive differential motion vector values within the range of the motion vector values, to the remaining second differential motion vector values having a negative value in the same manner as those assigned to the largest and second largest differential motion vector values.

4. A method for variable-length-encoding a motion vector value according to claim 1, wherein said step (ii) comprises the steps of:
   (a) assigning a variable-length code and a residual code corresponding to the negative differential motion vector value having the largest absolute value and which is within the range of motion vector values, to the largest positive differential motion vector value among the second differential motion vector values;
   (b) assigning the variable-length code and the residual code corresponding to the negative differential motion vector value having the next largest absolute value and which is within the range of motion vector values, to the next largest positive differential motion vector value among the second differential motion vector values;
   (c) repeating step (ii)(b) until all second differential motion vector values having a positive value are assigned a variable-length code and a residual code according to one of steps (ii)(a) and (ii)(b);
   (d) assigning a variable-length code and a residual code corresponding to the positive differential motion vector value having the largest absolute value and which is within the range of motion vector values, to the largest negative differential motion vector value among the second differential motion vector values;
   (e) assigning a variable-length code and a residual code corresponding to the positive differential motion vector value having the second largest absolute value and within the range of motion vector values, to the second largest negative differential motion vector value among the second differential motion vector values; and
   (f) repeating step (ii)(e) until all second differential motion vector values having a negative value are assigned a variable-length code and a residual code according to one of steps (ii)(d) and (ii)(e).

5. A method for variable-length-encoding a motion vector value within a range of motion vector values for use in motion compensation, comprising the steps of:
   (i) generating a differential motion code table by a method comprising the steps of:
      (a) one of adding and subtracting a modulus, determined based on the range of the motion vector values, to a first differential motion vector value outside the range of the motion vector values, thereby producing a second differential motion vector value;
      (b) maintaining another differential motion vector value which is not outside the range of the motion vector values as a third differential motion vector value;
      (c) assigning a variable-length codeword to each of the second and third differential motion vector values by using a predetermined residual code in correspondence to a variable-length code in a reference difference motion code table;
   (ii) altering a differential motion code table so that a relatively short variable-length code is assigned to the second differential motion vector value outside the range of motion vector values when the magnitude of the second differential motion vector value is relatively small, while a relatively long variable-length code is assigned to the second differential motion vector value outside the range of the motion vector values when the magnitude of the second differential motion vector value is relatively large,
   (iii) delaying a received motion vector value until a next motion vector value is applied and outputting the delayed motion vector value;
   (iv) calculating a differential motion vector value from the delayed motion vector value and the next motion vector value; and
   (v) receiving the differential motion vector value calculated in step (iv) and variable-length-encoding the received differential motion vector value based on the differential motion code table altered in step (ii).

6. The method for variable-length-encoding a motion vector value as recited in claim 5, wherein in step (ii)(c) the variable-length codeword is assigned based on a quotient calculated by substituting a vector range selection parameter (f), which is determined with respect to a range altered differential motion vector value (mvd) comprised of the second and third differential motion vector values and the image, and the mvd into the expression f, wherein an absolute value of a residue of the calculation corresponds to the residual code, and wherein the residual code is concatenated to the variable-length code.

7. A method for variable-length-encoding a motion vector value according to claim 5, wherein said step (ii) of altering the differential motion code table comprises the steps of:
   (a) assigning, to the second differential motion vector value if it is positive, a variable-length code and a residual code corresponding to a negative differential motion vector value within the range of motion vector values having an absolute value the same distance from the negative differential motion vector value within the range of motion vector values having the largest absolute value, as the second differential motion vector value is from a negative second differential motion vector value having a largest absolute value; and
   (b) assigning, to the second differential motion vector value it if is negative, a variable-length code and a residual code corresponding to a positive differential motion vector value within the range of motion vector values having an absolute value the same distance from the positive differential motion vector value within the range of motion vector values having the largest absolute value, as the second differential motion vector value is from a positive second differential motion vector value having a largest absolute value.

8. An apparatus for variable-length-encoding a motion vector value within a range of motion vector values for use in compensation, comprising:
   a delay unit for delaying a received motion vector value until a next motion vector value is received and outputting the delayed motion vector value;
   a subtracter for calculating a differential motion vector value from the delayed motion vector value and a subsequently received motion vector value; and
   a variable-length encoder for storing an altered differential motion code table, receiving the differential motion vector value from said subtracter and variable-length-encoding the differential motion vector value based on the stored altered differential motion code table, so that a relatively short variable-length code is assigned to a second differential motion vector value outside the range of the motion vector values when the magnitude of the second differential motion vector value is relatively small, while a relatively longer variable-length code is assigned to the second differential motion vector value outside the range of the motion vector values when the magnitude of the second differential motion vector value is relatively larger.

9. An apparatus for variable-length-encoding a motion vector value according to claim 8, wherein said altered differential motion code table is generated by one of adding and subtracting a modulus determined by the range of motion vector values, to differential motion vector values outside a range of the motion vector values among first differential motion vector values of the motion vector values generated in an image, thereby producing second differential motion vector values of which the magnitudes are altered into those of the motion vector values, and maintaining third differential motion vector values which are within the range of motion vector values, thereby altering the range of differential motion vector values so that all first differential motion vector values are within the range of the motion vector values, and calculating a quotient by substituting a vector range selection parameter (f), which is determined with respect to a range altered differential motion vector value (mvd) and an image, and the mvd into an expression f, and assigning a variable-length code word with respect to each first differential motion vector value, corresponding to the quotient and a residual code corresponding to a residue of the calculation, wherein said residual code is concatenated to the variable-length code.

* * * * *